United States Patent [19]

Hide

[11] Patent Number: 4,544,343

[45] Date of Patent: Oct. 1, 1985

[54] APPARATUS FOR PRODUCING POLYACETYLENE FILM

[75] Inventor: Ichiro Hide, Sapporo, Japan

[73] Assignee: Hoxan Corporation, Sapporo, Japan

[21] Appl. No.: 649,507

[22] Filed: Sep. 11, 1984

[30] Foreign Application Priority Data

Sep. 12, 1983 [JP] Japan .......................... 58-141185[U]

[51] Int. Cl.⁴ .................. B29C 25/00; B01J 12/02
[52] U.S. Cl. ........................................ 425/224; 264/83; 422/131; 526/285; 425/230; 425/363
[58] Field of Search ................. 425/224, 225, 230; 264/81, 83; 422/131

[56] References Cited

U.S. PATENT DOCUMENTS

| | | | |
|---|---|---|---|
| 2,862,783 | 12/1958 | Drummond | 264/81 X |
| 2,935,372 | 5/1960 | Steuber | 264/83 |
| 3,046,170 | 7/1962 | Toulmin | 264/81 X |
| 4,038,352 | 7/1977 | Hennequin | 264/81 |
| 4,075,383 | 2/1978 | Anderson et al. | 264/83 X |
| 4,154,797 | 5/1979 | Miserlis et al. | 422/131 |
| 4,372,919 | 2/1983 | Kubo et al. | 422/131 X |

Primary Examiner—J. Howard Flint, Jr.
Attorney, Agent, or Firm—Schwartz, Jeffery, Schwaab, Mack, Blumenthal & Evans

[57] ABSTRACT

An apparatus for producing a polyacetylene film by polymerizing acetylene gas in contact with Ziegler-Natta catalyst comprising: in a vessel to be introduced with acetylene gas a film producing container for storing Ziegler-Natta catalyst, a pair of feed rollers provided adjacently to draw out the polyacetylene film polymerized on the surface of the catalyst and reversely driven in roll contact with each other, a cleaning member for cleaning the drawn polyacetylene film, and a winding unit for winding the polyacetylene film. Thus, the polyacetylene film can be continuously produced with good productivity, and since the speed for drawing the polyacetylene film is varied to regulate the thickness of the film, the films of various size can be readily fabricated in mass production, thereby reducing the cost of the polyacetylene film.

3 Claims, 4 Drawing Figures

APPARATUS FOR PRODUCING POLYACETYLENE FILM

BACKGROUND OF THE INVENTION

This invention relates to an apparatus for continuously producing a polyacetylene film by Ziegler-Natta catalyst.

A polyacetylene is the most simple chain-conjugated high-molecular compound which contains as ingredients a carbon atom and a hydrogen atom, and has properties as a semiconductor. Particularly, a polyacetylene membrane which is laminated with Ziegler-Natta catalyst [$Ti(OC_4H_9)_4$—$Al(C_2H_5)_3$ series] has fibril (fibrous ultrafine crystal) mesh structure of apporx. 200 Å in diameter. When this membrane slightly doped with halogen gas or arsenic pentafluoride, its conductivity can be largely varied.

Since such a polyacetylene membrane has extremely chemical stability, a light weight and a fibril mesh structure, resulting in a large surface area, the polyacetylene membrane has already noted as favorable electrode materials for a secondary battery or applications for integrated circuits.

In order to produce the above-described polyacetylene film, it was heretofore known to produce the polyacetylene film by the method which has the steps of preparing the molar ratio of aluminum/titanium of the Ziegler-Natta catalyst to 4 to 4, and cooling the catalyst at $-78°$ C. with a refrigerant of a dry ice methanol, blowing acetylene gas to the catalyst, thereby polymerizing the gas in the vicinity of the boundary between the vapor phase and the liquid phase in the surface of the catalyst solution.

When the polyacetylene film is heretofore actually produced, a substrate b made, for example, of glass is contained, as shown in FIG. 1, in a vessel a, the Ziegler-Natta catalyst is coated on the surface of the substrate b, acetylene gas introduced via a supply tube c into the vessel a is blowed to the substrate b, thereby polymerizing to produce the polyacetylene film d of the same shape as the substrate b. Reference character e in FIG. 1 designates an acetylene gas exhaust tube.

In the conventional case, the substrate b must be, however, exchanged by opening the vessel a whenever the film is produced in a worse workability, and the polyacetylene film thus produced is disadvantageously limited in thickness and area.

SUMMARY OF THE INVENTION

Accordingly, it is an object of this invention to provide an apparatus for producing a polyacetylene film which can eliminate the aforementioned drawbacks and disadvantages and can continuously produce a polyacetylene.

The above and other related objects and features of the invention will be apparent from a reading of the following description of the disclosure found in the accompanying drawings and the novelty thereof pointed out in the appended claims.

DESCRIPTION OF THE PREFERRED EMBODIMENTS

The present invention will now be described in more detail with reference to the accompanying drawings.

Figure 1A:
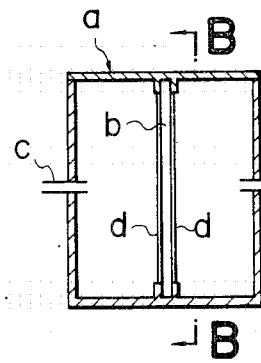
FIG. 1a is a schematic vertical sectional front view showing a conventional apparatus for producing a polyacetylene film.
Figure 1B:
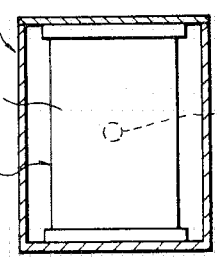
FIG. 1b is a sectional view taken along the line B—B in FIG. 1a as seen in a direction of arrows B.
Figure 2:
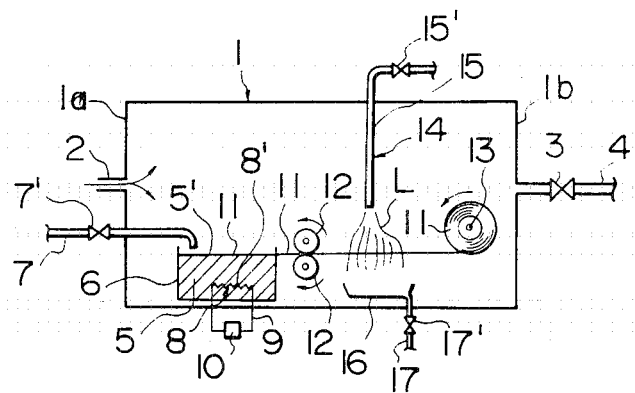
FIG. 2 is an explanatory view showing a first embodiment of an apparatus for producing a polyacetylene film according to the present invention.

In FIG. 2, reference numeral 1 designates a vessel formed in a box shape. Acetylene gas is freely introduced from a supply conduit 2 connected to one side wall 1a of the vessel 1, and an exhaust conduit 4 of the same gas having a switching control valve 3 is connected to the other side wall 1b of the vessel 1. The pressure of the acetylene gas introduced into the vessel 1 is maintained constantly by controlling to open or close the valve 3.

The valve 3 may employ a diaphragm valve which operates to open or close under a predetermined constant pressure, or may also use a solenoid valve which is controlled to be opened or closed by a signal from a detector separately provided for detecting the pressure of the gas in the vessel 1.

A coverless container 6 for producing a film for storing Ziegler-Natta catalyst 5 substantially in a full state if installed at the side of the supply conduit 2 in the vessel 1, and the Ziegler-Natta catalyst 5 is supplied via a catalyst supply conduit 7 having an opening or closing valve 7' to the container 6 at a predetermined time, thereby holding the quantity of the catalyst constant in the container 6.

A temperature regulator 8 for regulating the temperature of the Ziegler-Natta catalyst 5 is provided in the container 6. The regulator 8 is composed of a heat exchanger 8' in the container 6 and a heat medium supply source 10 for circulating and supplying heat medium such as refrigerant to the heat exchanger 8' via a conduit 9.

Feed rollers 12, 12 for drawing a polyacetylene film 11 from the container 6 when the polyacetylene film 11 is polymerized as will be described later on the surface 5' of the Ziegler-Natta catalyst 5 contained in the container 6, i.e., in the vicinity of the boundary between a vapor phase and a liquid phase of the catalyst 6, are provided laterally in the vicinity of the side of the container 6 in such a manner that the rollers are disposed elevationally at the upper and lower positions. Thus, a pair of the rollers 12, 12 are contacted with each other in a rolling manner to be able to be reversely driven.

On the other hand, a winding unit 13 such as a roller for winding the polyacetylene film 11 is rotatably drivably arranged in parallel with the rollers 12, 12 at the side of the exhaust conduit 4 in the vessel 1.

A cleaning member 14 is provided between the rollers 12, 12 and the winding unit 13 to clean and remove the Ziegler-Natta catalyst 5 adhered to the polyacetylene film 11. The cleaning member 14 is composed of a cleanser supply conduit 15 arranged through an opening or closing valve 15' out of the vessel 1. Cleanser L such as toluene is injected and flowed down from the supply conduit 15, thereby cleaning the polyacetylene film 11. The cleanser L is flowed into a tray 16 provided in the bottom of the vessel 1, and exhausted externally via a conduit 17 having an opening or closing valve 17'.

In operation for producing the polyacetylene film by using the apparatus thus constructed as described above, acetylene gas is introduced via the supply conduit 2 into the vessel 1 under a predetermined pressure. Thus, the acetylene gas is polymerized by the catalyst 5 to become the polyacetylene film 11 on the surface 5' of the Ziegler-Natta catalyst 5 in the container 6 for producing the film.

The Ziegler-Natta catalyst 5 is preferably held in a full state in the container 6 to draw the polyacetylene film 11.

In this case, the temperature of the Ziegler-Natta 5 is regulated to a predetermined temperature by the temperature regulator 8, thereby producing the polyacetylene film 11 by cispolyacetylene of geometrical isomer of polyacetylene or transpolyacetylene.

This polyacetylene film 11 is drawn by a pair of feed rollers 12 and 12, wound on the winding unit 13, and the Ziegler-Natta catalyst 5 adhered to the polyacetylene film 11 is cleaned and removed by the cleanser L injected and flowed down from the supply conduit 15 in the meantime.

Since it takes a certain amount of time to polymerize the polyacetylene film 11 in this case, the rotating speeds of the rollers 12, 12 is low, the winding unit 13 is rotatably driven at the corresponding speed. Thus, the thickness of the polyacetylene film 11 can be varied by altering the rotating speed of the feed rollers 12, 12 and the winding unit 13, thereby producing the polyacetylene film 11 matched for the various utilities.

Figure 3:
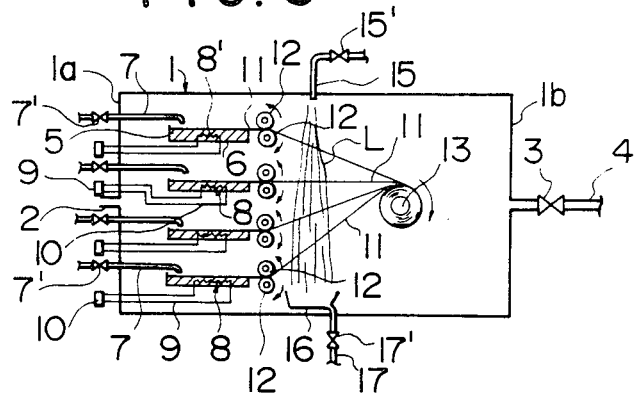
FIG. 3 is an explanatory view showing another embodiment of the apparatus of the invention.

FIG. 3 shows another embodiment of an apparatus for producing a polyacetylene film according to the present invention. This embodiment is different from the first embodiment of the invention at the points that containers 6, 6, . . . for producing the film are provided in multiple stages at the supply conduit 2 side in a vessel 1 and a plurality of polyacetylene films 11 can be wound on a winding unit 13 in the laminated state. In the embodiment exemplified in FIG. 3, the four containers 6 are provided at the upper and lower stages, catalyst supply conduits 7, temperature regulators 8, and feed rollers 12, 12 are correspondingly provided for the four containers 6, and four layer polyacetylene films 11, 11, . . . are wound on the winding unit 13.

According to the present invention as described above, since there is provided an apparatus for producing a polyacetylene film 11 by polymerizing acetylene gas in contact with Ziegler-Natta catalyst 5 which comprises in a vessel 1 to be introduced with acetylene gas a film producing container 6 for storing Ziegler-Natta catalyst 5, a pair of feed rollers 12, 12 provided adjacently to draw out the polyacetylene film 11 polymerized on the surface 5' of the catalyst 5 and reversely driven in roll contact with each other, a cleaning member 14 for cleaning the drawn polyacetylene film 11, and a winding unit 13 for winding the polyacetylene film 11, the polyacetylene film 11 can be continuously produced with good productivity, and since the speed for drawing the polyacetylene film 11 is varied to regulate the thickness of the film 11, the films of various size can be readily fabricated in mass production, thereby reducing the cost of the polyacetylene film 11.

What is claimed is:

1. An apparatus for producing a polyacetylene film by polymerizing acetylene gas in contact with Ziegler-Natta catalyst comprising: in a vessel to be introduced with acetylene gas
a film producing container for storing Ziegler-Natta catalyst,
a pair of feed rollers provided adjacently to draw out the polyacetylene film polymerized on the surface 5' of the catalyst and reversely driven in roll contact with each other,
a cleaning member for cleaning the drawn polyacetylene film, and
a winding unit for winding the polyacetylene film.

2. The apparatus according to claim 1, further comprising a temperature regulator provided in said container for regulating the temperature of the Ziegler-Natta catalyst.

3. The apparatus according to claim 1, further comprising a number of containers for producing polyacetylene films, and said winding unit winds laminated polyacetylene films.

* * * * *